(12) United States Patent
Zhou

(10) Patent No.: US 12,379,040 B1
(45) Date of Patent: Aug. 5, 2025

(54) PORTABLE UNIVERSAL VALVE NOZZLE AND INFLATION DEVICE THEREOF

(71) Applicant: CHENGDU CHENDIAN INTELLIGENT TECHNOLOGY CO., LTD., Chengdu (CN)

(72) Inventor: Longpeng Zhou, Chengdu (CN)

(73) Assignee: CHENGDU CHENDIAN INTELLIGENT TECHNOLOGY CO., LTD., Sichuan (CN)

( * ) Notice: Subject to any disclaimer, the term of this patent is extended or adjusted under 35 U.S.C. 154(b) by 0 days.

(21) Appl. No.: 19/098,974

(22) Filed: Apr. 2, 2025

(30) Foreign Application Priority Data

Oct. 29, 2024 (CN) .......................... 202422617171.0
Jan. 23, 2025 (CN) .......................... 202520158970.8

(51) Int. Cl.
*F16K 24/06* (2006.01)
(52) U.S. Cl.
CPC .................................... *F16K 24/06* (2013.01)
(58) Field of Classification Search
CPC .................................. F16K 24/06; F16K 51/00
See application file for complete search history.

(56) References Cited

U.S. PATENT DOCUMENTS

| | | | | |
|---|---|---|---|---|
| 6,076,544 A * | 6/2000 | Pierce | ..................... | F16L 37/18 |
| | | | | 251/149.8 |
| 8,186,373 B2 * | 5/2012 | Huang | .................. | F04B 33/005 |
| | | | | 285/354 |
| 9,133,970 B2 * | 9/2015 | Wang | ..................... | F16L 37/28 |
| 2014/0190576 A1 * | 7/2014 | Wang | ..................... | F16K 15/20 |
| | | | | 137/231 |

* cited by examiner

*Primary Examiner* — P. Macade Nichols
(74) *Attorney, Agent, or Firm* — Ming Jiang; OPENPTO US LLC

(57) ABSTRACT

Disclosed are a portable universal valve nozzle and an inflation device thereof. The portable universal valve nozzle includes a valve nozzle body composed of a first connection port and a second connection port; a valve pin arranged inside the valve nozzle body composed of a rod-shaped pin head and a hollow tubular pin body; where the valve pin is arranged inside the valve nozzle body in an axial direction in two different states; in a first state, the pin head points toward the first connection port; and in a second state, the pin head points toward the first connection port. The portable universal valve nozzle achieves convenient compatibility with both the Schrader valve and the Presta valve while ensuring good airtightness. Through two different installation states of the pin head, the portable universal valve nozzle of the present disclosure can adapt to different types of valve nozzles.

20 Claims, 4 Drawing Sheets

PORTABLE UNIVERSAL VALVE NOZZLE AND INFLATION DEVICE THEREOF

The present invention claims priorities of Chinese Patent Application No. 202422617171.0, filed on Oct. 29, 2024, and No. 202520158970.8, filed on Jan. 23, 2025, the entire contents of which are hereby incorporated by reference.

TECHNICAL FIELD

The present disclosure belongs to the field of valve nozzles, and particularly relates to a portable universal valve nozzle and an inflation device thereof.

BACKGROUND

Currently, an inflation method for bicycle tires is universally applicable to pneumatic tires, which is widely used in various types of bicycles, including mountain bikes, road bikes, commuter bikes, and the like. Two main types of tire valves available for mainstream inflatable tires on the market are Schrader valve (referred to as American valve) and Presta valve (referred to as French valve). Interface designs of the two types of valves are different, requiring different adaptation methods when they are connected to an inflation device.

In the prior art, one method is to use a main unit of an inflating pump together with a silicone air hose (provided with a Schrader valve adapter), such that it can be directly adapted to the Schrader valve, and an interface of the Presta valve can be inverted into an interface shape of Schrader valve through a Presta valve adapter, thereby facilitating inflation. The method can adapt to the two types of air vales, but it has the disadvantage of relatively large size, which occupies a larger space and makes it less convenient for cyclists who need to carry the device.

Another method is to directly install a valve nozzle structure onto an ultra-small inflating pump, without the need for using an air pipe adapter. When it is adapted to a Schrader valve, a valve pin is used; and when it is adapted to a Presta valve, the valve pin needs to be removed. The main disadvantage of the method is that the valve pin cannot be stored in the device, the cyclists may forget to take the valve pin, making it impossible to inflate the Schrader valve and thereby limiting the reliability and convenience of use.

SUMMARY

In order to solve the above technical problems in the prior art, the present disclosure provides a portable universal valve nozzle.

In order to achieve the above objectives, the present disclosure adopts the following technical solutions:
a portable universal valve nozzle, including:
a valve nozzle body, including a first connection port and a second connection port;
a valve pin arranged inside the valve nozzle body, where the valve pin includes:
a rod-shaped pin head;
a hollow tubular pin body;
the valve pin can be arranged inside the valve nozzle body in an axial direction in two different states, where:
in a first state, the pin head points toward the first connection port; and
in a second state, the pin head points toward the first connection port.

Preferably, a diameter of the pin head is smaller than a diameter of the pin body, and is also smaller than diameters of both the second connection port and the first connection port.

Preferably, the valve nozzle body includes:
a first housing and a second housing; and
the first housing and the second housing are detachably connected.

Preferably, an installation space is formed when the first housing and the second housing are in a connected state, and the installation space is configured for installing the valve pin.

Preferably, one end of the pin body is open, and the other end thereof is sealed to form a sealed end;
and a valve nozzle channel is formed starting from the open end of the pin body and ending at the sealed end.

Preferably, a diameter of the sealed end is greater than a diameter of a circumferential wall of the pin body;
and an air intake gap is formed between the circumferential wall of the pin body and the valve nozzle body.

Preferably, first air ports are formed on an end face of the sealed end.

Preferably, the first air ports are circular or rectangular, and form a circular array on the sealed end.

Preferably, second air ports are formed on the circumferential wall of the pin body.

Preferably, the second air ports are slot-shaped holes, and are arranged at equal intervals on the circumferential wall of the pin body.

Preferably, the valve nozzle further includes a sealing ring; and
the sealing ring is arranged inside the valve nozzle body, and installed at a position close to the first connection port.

Preferably, the sealing ring forms a through connecting channel.

Preferably, a sealing groove is formed on an end face of the sealing ring facing toward the valve pin; and
the sealed end or the circumferential wall of the pin body is tightly connected to the sealing groove.

Preferably, a sealing layer made of rubber material is attached to an inner wall surface of the second housing or an outer wall surface of the first housing.

Preferably, a diameter of the first connection port of the first housing is greater than a diameter of a main body of the first housing.

Preferably, the first housing has a circular tubular structure, and the second housing also has a circular tubular structure.

Preferably, an inner wall surface of the first connection port is provided with internal threads.

Preferably, the second housing is provided with a protruding connecting nozzle, and the connecting nozzle is configured for a sealing connection with the air outlet of the inflation device.

Preferably, a through channel is formed inside the connecting nozzle, and the channel is connected to the second connection port.

The present disclosure further provides an inflation device, which includes the portable universal valve nozzle described in the above technical solution.

The present disclosure provides a portable universal valve nozzle and an inflation device thereof, which has the following beneficial effects:

The portable universal valve nozzle of the present disclosure achieves convenient compatibility with both the Schrader valve and the Presta valve while ensuring good airtightness. Through two different installation states of the pin head, the portable universal valve nozzle of the present disclosure can adapt to different types of valve nozzles, such that a user can easily switch between the different types of valve nozzles, without the need for additional tools or complex operations, thereby ensuring good sealing performance when being connected to the Schrader valve and the Presta valve, preventing air leakage, and improving inflation efficiency and reliability.

Figure 1:
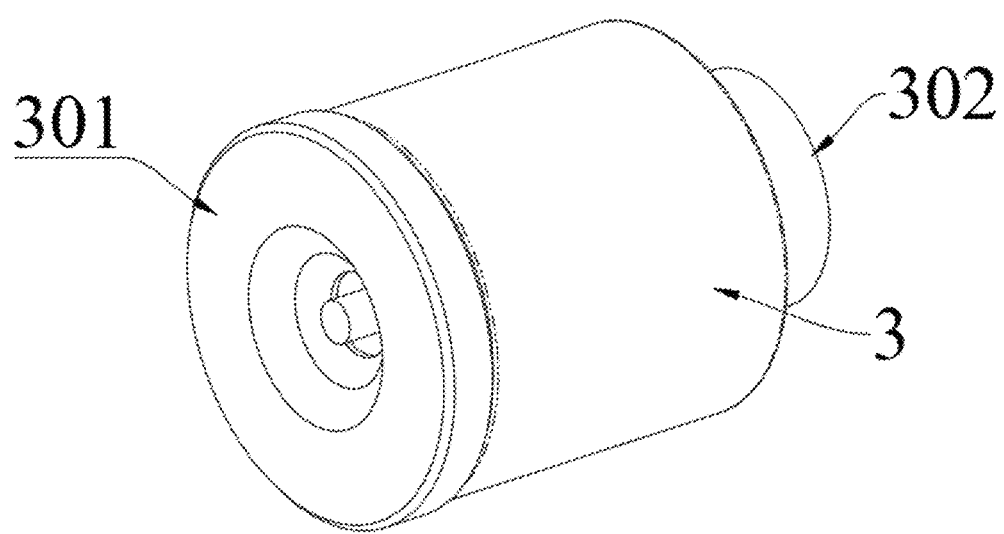
FIG. 1 is a perspective view of a portable universal valve nozzle according to the present disclosure.

Reference numerals in the accompanying drawings:

1. Schrader valve; 2. Presta valve; 3. valve nozzle body; 301. first connection port; 302. second connection port; 303. first housing; 306. second housing; 304. connecting nozzle; 4. valve pin; 401. pin head; 402. pin body; 4021. sealed end; 4022. valve nozzle channel; 501. first air port; 502. second air port; 6. sealing ring; 601. connecting channel; and 602. sealing groove.

DETAILED DESCRIPTIONS OF THE EMBODIMENTS

The technical solutions of embodiments of the present disclosure will be described below clearly and comprehensively in conjunction with accompanying drawings of the embodiments of the present disclosure. Apparently, the embodiments described are merely some embodiments rather than all embodiments of the present disclosure. All the other embodiments obtained by those of ordinary skill in the art based on the embodiments in the present disclosure without creative efforts shall fall within the scope of protection of the present disclosure.

Figure 2:
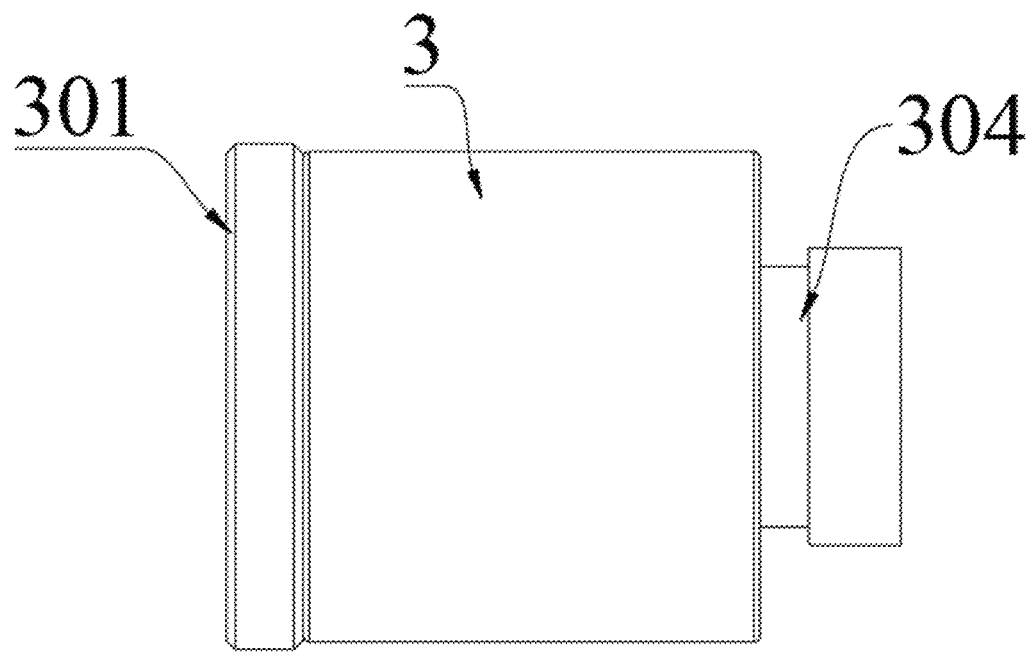
FIG. 2 is a front view of a portable universal valve nozzle according to the present disclosure.

With reference to FIGS. 1-8, specific embodiments provided by the present disclosure are as follows:

With reference to FIGS. 1 and 2, provided is a universal valve nozzle, which is designed to provide a portable device capable of adapting to connection with different types of valve nozzles (such as a Schrader valve 1 and a Presta valve 2). Specifically, through the portable universal valve nozzle, a user can connect the Schrader valve 1 or the Presta valve 2 to an inflation device (such as an air pump) to achieve universal adaptation to different type of valve nozzles.

The universal valve nozzle mainly consists of a valve nozzle body 3, where the valve nozzle body 3 includes a first connection port 301 and a second connection port 302. Specifically, the first connection port 301 is configured to form a sealing connection with the Schrader valve 1 or the Presta valve 2, and the second connection port 302 is configured to be connected to the inflation device. In addition, the first connection port 301 may be connected to the inflation device, while the second connection port 302 may be connected to the Schrader valve 1 or the Presta valve 2, as needed.

In this embodiment, the first connection method is adopted, in which the valve nozzle body 3 consists of a first housing 303 and a second housing 306, both of which are detachably connected. Specifically, a port is formed at one end of the first housing 303, and the port can be snap-fitted with a port of the second housing 306 to form a cylindrical valve nozzle body 3.

An end face of the first housing 303 is provided with an opening, that is, the first connection port 301, which is configured to form a sealing connection with the Schrader valve 1 or the Presta valve 2. Similarly, an end face of the second housing 306 is also provided with an opening, that is, the second connection port 302, which is configured to connect with the inflation device. Generally, the end face of the second housing 306 is further provided with a protruding connecting nozzle 304, a through channel is formed inside the connecting nozzle 304, which is connected to the second connection port 302. Through the connecting nozzle 304, a sealing connection with the air outlet of the inflation device can be achieved, such that air can be pumped from the inflation device, enter an interior of the valve nozzle body 3 through the channel of the connecting nozzle 304, and then flow into the Schrader valve 1 or the Presta valve 2 through the first connection port 301.

Specifically, a certain installation space is formed when the first housing 303 and the second housing 306 are in a connected state, and the installation space is configured for installing a valve pin 4.

In one specific implementation of this embodiment, the first housing 303 has a circular tubular structure, and correspondingly, the second housing 306 also has a circular tubular structure. Specifically, the first housing 303 and the second housing 306 can be butted and coupled together to form a complete cylindrical valve nozzle body 3.

Specifically, a sealing layer is arranged between a contact area between the first housing 303 and the second housing 306, such as between an outer wall surface of the first housing 303 and an inner wall surface of the second housing 306. For example, a sealing layer made of rubber material is attached to the outer wall surface of the first housing 303, or a sealing layer made of rubber material is attached to the inner wall surface of the second housing 306, thereby forming a sealing structure at this position.

A diameter of the first connection port 301 of the first housing 303 is greater than a diameter of a main body of the first housing 303. That is to say, when the first housing 303 is inserted into an interior of the second housing 306, the first connection port 301 is snap-fitted on an opening at an end of the second housing 306, thereby forming a sealing structure between the first housing 303 and the second housing 306.

Figure 7:
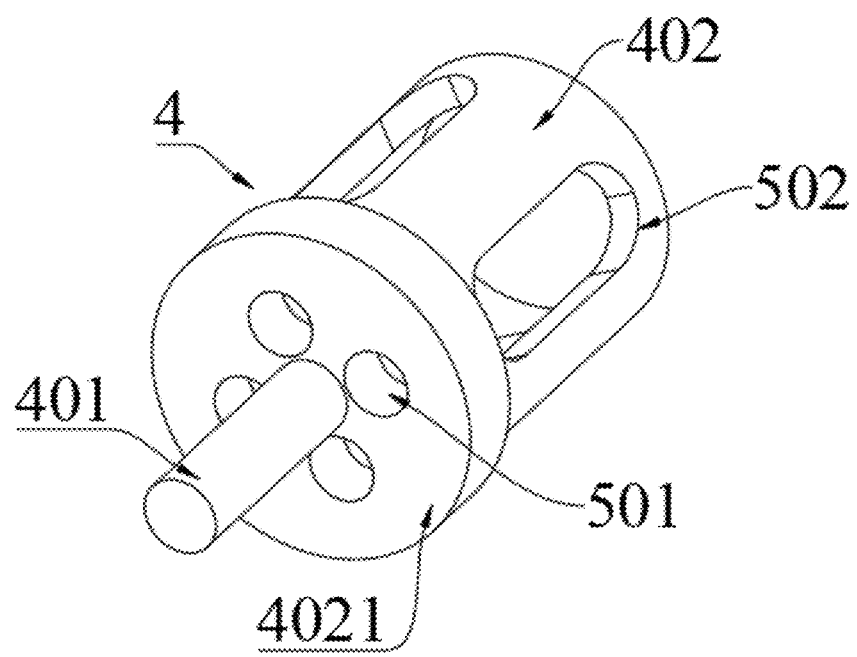
FIG. 7 is a first perspective view of a valve pin of a portable universal valve nozzle according to the present disclosure.
Figure 8:
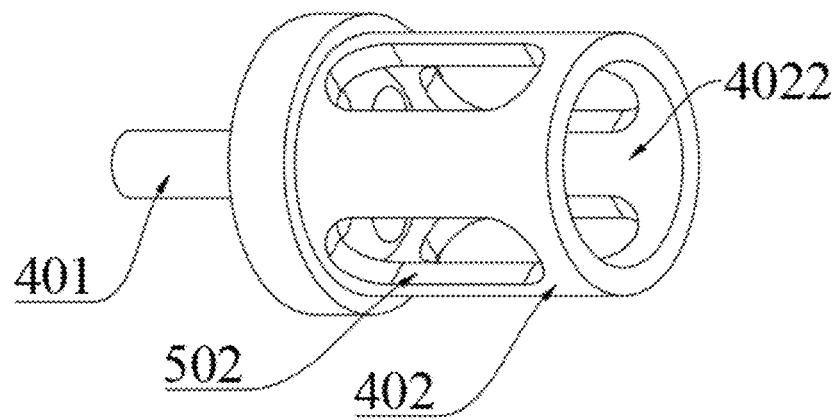
FIG. 8 is a second perspective view of a valve pin of a portable universal valve nozzle according to the present disclosure.

With reference to FIGS. 7 and 8, the valve pin 4 is arranged in the interior of the valve nozzle body 3, that is, inside an installation space. The valve pin 4 includes a pin head 401 and a pin body 402.

The pin body 402 is a hollow tube, one end of the pin body 402 is open, and the other end thereof is sealed, that is, it has a sealed end 4021. A valve nozzle channel 4022 is formed starting from the open end of the pin body 402 and ending at the sealed end 4021, and the valve nozzle channel is configured to receive the valve nozzle, especially the Presta valve 2. When a stem of the Presta valve 2 is inserted into the valve nozzle passage 4022, a valve core of the Presta valve 2 abuts against an inner wall surface of the sealed end 4021, such that the valve core of the Presta valve 2 is pushed and opened.

As shown in FIGS. 7 and 8, first air ports 501 are formed on the sealed end 4021 of the pin body 402. The first air ports 501 face toward the second connection port 302, and an airflow flows into an interior of the pin body 402 after passing through the second connection port 302 and the first air ports 501, and then flows into the Presta valve 2.

In one implementation, the first air ports 501 may be circular or rectangular, and may form a circular array on the sealed end 4021. For example, the first air ports 501 may be two, four, six, or the like.

In some embodiments, as shown in FIGS. 7-8, second air ports 502 are formed on a circumferential wall of the pin body 402. A diameter of the valve core of some Presta valves 2 is larger, which blocks an airflow passage between the first air ports 501 and the stem of the Presta valve 2, resulting in a reduction in an airflow rate. Based on this, the second air ports 502 are introduced. The second air ports 502 allow the airflow to enter from the first air ports 501 to flow out from the second air ports 502, and then enter a gap between the second air ports 502 and the interior of the valve nozzle body 3, thereby increasing an airflow capacity and avoiding the reduced inflation efficiency caused by a reduction in the airflow rate.

In one implementation, the second air ports 502 are slot-shaped holes, which are arranged at equal intervals on the circumferential wall of the pin body 402. For example, the second air ports 502 may be two, four, or the like.

As shown in FIGS. 7 and 8, the pin head 401 is cylindrical and is installed on an end face of the sealed end 4021 away from the pin body 402. A diameter of the pin head 401 is smaller than a diameter of the pin body 402, and is also smaller than diameters of both the second connection port 302 and the first connection port 301.

Figure 3:
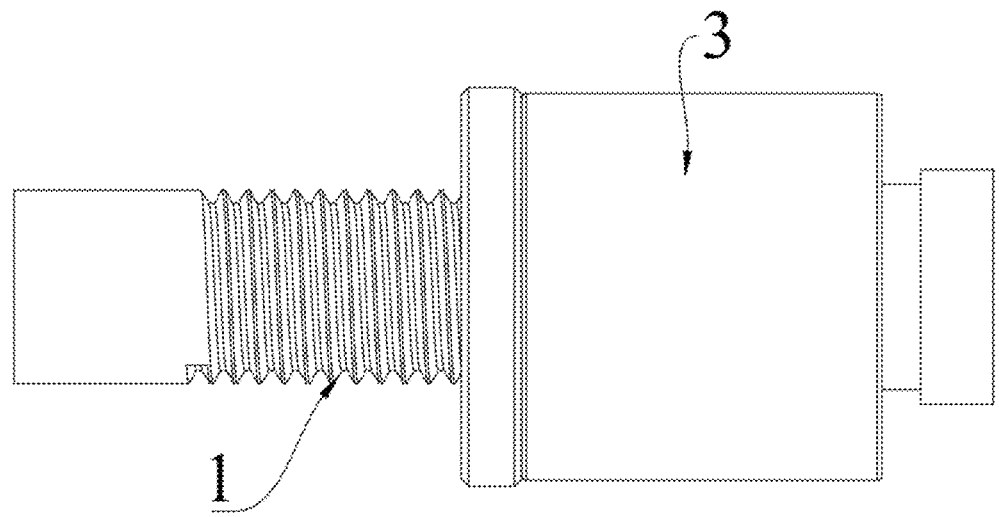
FIG. 3 is a schematic diagram of assembly of a portable universal valve nozzle according to the present disclosure and a Schrader valve.
Figure 4:
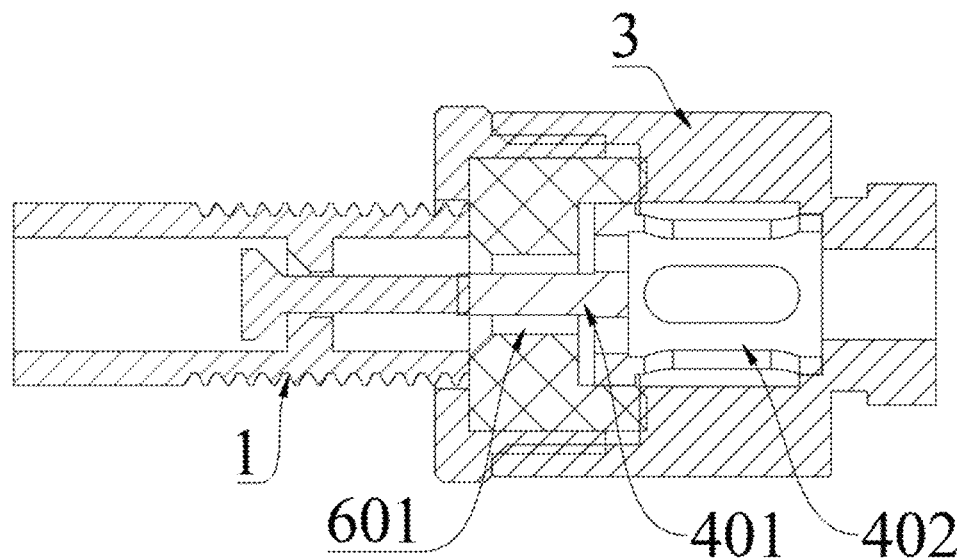
FIG. 4 is a sectional view of the structure shown in FIG. 3.

The pin head 401 has two installation states:

As shown in FIGS. 3 and 4, in one installation state, the valve nozzle body 3 is adapted to the Schrader valve 1. Specifically, the pin head 401 faces toward the first connection port 301. The Schrader valve 1 is installed at the first connection port 301, where an inner wall surface of the first connection port 301 is provided with internal threads to form a threaded connection with the Schrader valve 1, the valve core comes into contact with the pin head 401 of the valve pin 4, the pin head 401 pushes the valve core forward a certain distance to open a valve core of the Schrader valve 1.

Figure 5:
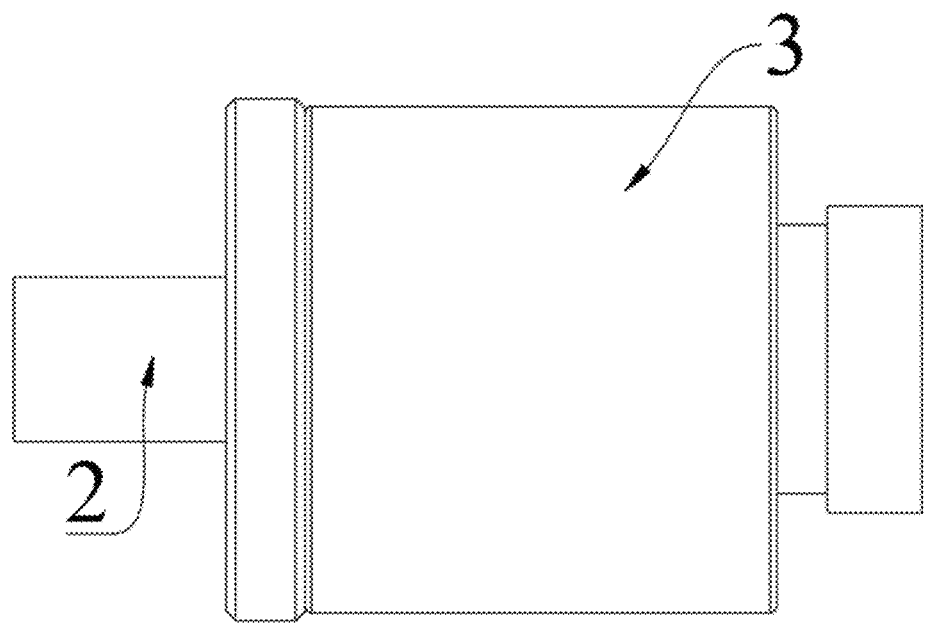
FIG. 5 is a schematic diagram of assembly of a portable universal valve nozzle according to the present disclosure and a Presta valve.
Figure 6:
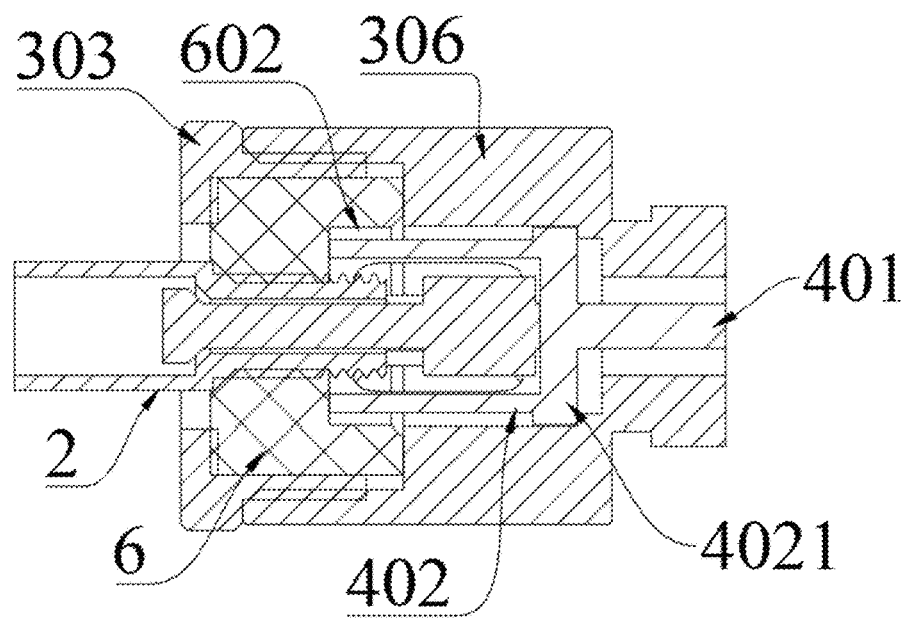
FIG. 6 is a sectional view of the structure shown in FIG. 5.

As shown in FIGS. 5 and 6, in the other installation state, the valve nozzle body 3 is adapted to the Presta valve 2. Specifically, the pin head 401 faces toward the second connection port 302. The Presta valve 2 is installed at the first connection port 301, a valve core thereof extends into the valve nozzle channel 4022 of the valve pin 4, and abuts against the inner wall surface of the sealed end 4021, such that the valve core of the Presta valve 2 is opened.

A scaling ring 6 is arranged in the interior of the valve nozzle body 3, and the sealing ring 6 is installed at a position close to the first connection port 301. The sealing ring 6 forms a connecting channel 601, which is suitable for connecting both Schrader valves 1 and Presta valves 2, such as by threaded connection or tight snap-fit connection. Specifically, the stem of the Schrader valve 1 or the Presta valve 2 comes into close contact with an inner wall of the connecting channel 601, ensuring a sealing connection in a connection process to prevent air leakage. This design ensures a reliable airtight connection no matter whether a Schrader valve 1 or a Presta valve 2 is used.

The sealing ring 6 is made of silicone or rubber.

In one specific embodiment, the sealing ring 6 has a sealing groove 602, and the sealing groove 602 faces toward the valve pin 4. Regardless of the above installation states, the sealing groove 602 can form a sealing connection with the sealed end 4021 or the circumferential wall of the pin body 402, thereby ensuring airtightness.

This embodiment further provides an inflation device, which includes the portable universal valve nozzle described in the above embodiment.

In the description of the embodiments of the present disclosure, it should be understood that the terms "upper", "lower", "front", "back", "left", "right", "vertical", "horizontal", "central", "top", "bottom", "top surface", "bottom", "inner", "outer", "inside", "outside" and other indicated orientations or positional relationships are based on orientation or position relations shown in the accompanying drawings.

In the description of the embodiments of the present disclosure, it should be noted that, unless otherwise explicitly specified and defined, the terms "mounting", "connecting", "connection" and "assembly" should be understood in a broad sense, for example, they may be a fixed connection, a detachable connection, or an integrated connection; and may be a direct connection, or an indirect connection via an intermediate medium, or communication inside two elements. For those of ordinarily skilled in the art, specific meanings of the above terms in the present disclosure could be understood according to specific circumstances.

In the description of the embodiments of the present disclosure, specific feature, structure, material or characteristics described may be combined in a suitable manner in any one or more embodiments or examples.

In the description of the embodiments of the present disclosure, it should be understood that that "-" and "~" represent the same range of two numerical values, and the range includes end values thereof, for example, "A-B" means a range greater than or equaling to A and less than or equaling to B. "A~B" means a range greater than or equaling to A and less than or equaling to B.

In the description of the embodiments of the present disclosure, the term "and/or" represents merely an association relationship describing associated objects, indicating that there may be three types of relationships, for example, A and/or B, which means three types of situation, that is, the existence of A alone, the existence of both A and B, and the existence of B alone. In addition, the character "/" herein generally indicates that the associated objects are in an "or" relationship.

Although the embodiments of the present disclosure have been illustrated and described, it should be understood that those of ordinary skill in the art may make various changes, modifications, replacements and variations to the above embodiments without departing from the principle and spirit of the present disclosure, and the scope of the present disclosure is limited by the appended claims and their legal equivalents.

What is claimed is:

1. A portable universal valve nozzle, comprising:
a valve nozzle body, comprising:
a first connection port configured to connect to a Schrader valve or a Presta valve;

a second connecting port configured to connect to an air outlet of an inflation device;
a valve pin arranged inside the valve nozzle body, wherein the valve pin comprises:
a rod-shaped pin head;
a hollow tubular pin body;
the pin head points toward the first connection port and is configured to connect to the Schrader valve; and
the pin body points toward the first connection port and is configured to connect to the Presta valve.

2. The portable universal valve nozzle according to claim 1, wherein
a diameter of the pin head is smaller than a diameter of the pin body, and is also smaller than diameters of both the second connection port and the first connection port.

3. The portable universal valve nozzle according to claim 1, wherein
the valve nozzle body comprises:
a first housing and a second housing; and
the first housing and the second housing are detachably connected.

4. The portable universal valve nozzle according to claim 3, wherein
an installation space is formed when the first housing and the second housing are in a connected state, and the installation space is configured for installing the valve pin.

5. The portable universal valve nozzle according to claim 2, wherein
one end of the pin body is open, and the other end thereof is sealed to form a sealed end; and
a valve nozzle channel is formed starting from the open end of the pin body and ending at the sealed end.

6. The portable universal valve nozzle according to claim 5, wherein
a diameter of the sealed end is greater than a diameter of a circumferential wall of the pin body; and
an air intake gap is formed between the circumferential wall of the pin body and the valve nozzle body.

7. The portable universal valve nozzle according to claim 5, wherein
first air ports are formed on an end face of the sealed end.

8. The portable universal valve nozzle according to claim 7, wherein
the first air ports are circular or rectangular, and form a circular array on the sealed end.

9. The portable universal valve nozzle according to claim 5, wherein
second air ports are formed on the circumferential wall of the pin body.

10. The portable universal valve nozzle according to claim 9, wherein
the second air ports are slot-shaped holes, and are arranged at equal intervals on the circumferential wall of the pin body.

11. The portable universal valve nozzle according to claim 1, further comprising
a sealing ring; wherein
the sealing ring is arranged inside the valve nozzle body, and installed at a position close to the first connection port.

12. The portable universal valve nozzle according to claim 11, further comprising
the sealing ring forms a through connecting channel.

13. The portable universal valve nozzle according to claim 11, wherein
a sealing groove is formed on an end face of the sealing ring facing toward the valve pin; and
the sealed end or the circumferential wall of the pin body is tightly connected to the sealing groove.

14. The portable universal valve nozzle according to claim 3, wherein
a sealing layer made of rubber material is attached to an inner wall surface of the second housing or an outer wall surface of the first housing.

15. The portable universal valve nozzle according to claim 3, wherein
a diameter of the first connection port of the first housing is greater than a diameter of a main body of the first housing.

16. The portable universal valve nozzle according to claim 3, wherein
the first housing has a circular tubular structure, and the second housing also has a circular tubular structure.

17. The portable universal valve nozzle according to claim 1, wherein
an inner wall surface of the first connection port is provided with internal threads.

18. The portable universal valve nozzle according to claim 1, wherein
the second housing is provided with a protruding connecting nozzle, and the connecting nozzle is configured for a sealing connection with the air outlet of the inflation device.

19. The portable universal valve nozzle according to claim 18, wherein
a through channel is formed inside the connecting nozzle, and the channel is connected to the second connection port.

20. An inflation device, comprising:
the portable universal valve nozzle according to claim 1.

* * * * *